(12) United States Patent
Mussman et al.

(10) Patent No.: US 6,243,388 B1
(45) Date of Patent: Jun. 5, 2001

(54) BROADBAND VIDEO SWITCH THAT PERFORMS PROGRAM MERGING AND METHOD THEREFOR

(75) Inventors: Harry Edward Mussman, Bedford; Stephen S. Liu, Acton; Thomas R. Helmes, Arlington, all of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/000,907

(22) Filed: Dec. 30, 1997

Related U.S. Application Data

(63) Continuation-in-part of application No. 08/347,618, filed on Nov. 30, 1994.

(51) Int. Cl.[7] ............................. H04L 12/28; H04L 12/56; H04J 3/12

(52) U.S. Cl. ............................. 370/420; 370/522; 725/78

(58) Field of Search ..................................... 370/410, 426, 370/485, 486, 496, 432, 390; 709/219; 348/7, 16; 455/416, 3.1, 4.2, 5.1; 379/202, 247; 725/78, 80, 82

(56) References Cited

U.S. PATENT DOCUMENTS

| | | |
|---|---|---|
| 3,825,690 | 7/1974 | Kelly et al. ............................. 179/15 |
| 4,912,700 | 3/1990 | Maddern et al. .................... 370/58.2 |
| 5,115,426 * | 5/1992 | Spanke .................................. 370/60 |
| 5,355,162 | 10/1994 | Yazolino et al. ....................... 348/11 |
| 5,371,532 | 12/1994 | Gelman et al. ........................... 348/7 |
| 5,436,890 | 7/1995 | Read et al. ............................. 370/58.2 |
| 5,530,754 | 6/1996 | Garfinkle ................................. 380/5 |
| 5,541,917 | 7/1996 | Farris .................................. 370/60.1 |
| 5,808,660 * | 9/1998 | Sekine et al. ............................. 348/8 |

(List continued on next page.)

OTHER PUBLICATIONS

Harry Mussman, "The Broadband Customer Service Module," Access, GTE's Technology Magazine, Spring 1993.

Harry Mussman et al., The Broadband Customer Service Module (B–CSM) : An Access. . .Fiber Lines, Globecom, Nov. 30, 1993.

(List continued on next page.)

*Primary Examiner*—Alpus H. Hsu
*Assistant Examiner*—Duc Ho
(74) *Attorney, Agent, or Firm*—Leonard Charles Suchyta; James K. Weixel

(57) ABSTRACT

A network (10) includes a broadband customer service module (B-CSM) (20). The B-CSM (20) includes a plurality of feeder interface cards (FICs) (36) and optical line cards (OLCs) (38) which are coupled together through a midplane assembly (34) so that each FIC (36) couples to all OLCs (38) and each OLC (38) couples to all FICs (36) through junctor groups (68). Within the B-CSM (20) circuit switching is performed electrically at an STS-1 rate. A reference clock which oscillates at a frequency slower than the data rate is routed with payload data so that it receives delays similar to those imposed on the payload data due to processing. At second stage switching fabrics (50) where data need to be extracted from signals flowing within the B-CSM (20), a clock regeneration circuit (32) generates a master clock signal oscillating at twice the data rate and phase synchronized to a delayed reference clock. A geometric compensation scheme corrects for timing skew which occurs when clocks and data are distributed to points or small areas from widely dispersed locations, and when clocks and data are distributed from points or small areas to widely dispersed locations. A variation of the Q.931 signaling protocol is implemented to enable the B-CSM (20) to respond to a request from a second subscriber interface unit (SIU) (100) to view a video program currently being delivered to a first SIU (100). The second SIU (100) need not have access to the identity of the video program before sending the switching request.

16 Claims, 9 Drawing Sheets

U.S. PATENT DOCUMENTS

| | | | | |
|---|---|---|---|---|
| 5,832,287 | * | 11/1998 | Atalla | 395/800 |
| 5,864,358 | * | 1/1999 | Suzuki et al. | 348/10 |
| 5,940,738 | | 8/1999 | Rao | 455/4.2 |
| 6,070,186 | * | 5/2000 | Nishio | 709/217 |

OTHER PUBLICATIONS

Lloyd R. Linnell, A Wide–Band Local Access System Using. . .Components, IEEE J. on Selected Areas in Comms., vol. SAC–4, #4, (Jul. 1986) p. 612–618.

Steven Minzer, "A Signaling Protocol . . . Services," IEEE J. on Selected Areas in Comms., vol. 9, No. 9, (Dec. 1991), p. 1383–1394.

Michael Cooperman et al., "Broadband Video Switching," IEEE Communications Magazine, vol. 27, #12, Dec. 1989.

Andreas Weber et al., "Multichannel Circuit Switching—Networks," IEEE J. on Selected Areas in Comms., vol. 9, #2, (Feb. 19 p. 226–232.

* cited by examiner

BROADBAND VIDEO SWITCH THAT PERFORMS PROGRAM MERGING AND METHOD THEREFOR

RELATED APPLICATION

This application is a Continuation-In-Part of "Data Transferring Circuit which Aligns Clock and Data," by Harry E. Mussman et al., Ser. No. 08/347,618, filed Nov. 30, 1994.

TECHNICAL FIELD OF THE INVENTION

The present invention relates generally to systems which process digital data. More specifically, the present invention relates to the high speed processing of synchronous data, such as may occur in a switch for a broadband network.

BACKGROUND OF THE INVENTION

Networks transfer electronic information between different locations. Broadband networks differ from other networks in that they transfer a relatively large amount of information during each unit of time. Future broadband networks are expected to convey video signals for business, educational and residential applications. Such networks may provide services such as broadcast-like video distribution, individual access to video program libraries, video telephone, video conferencing, and the like. Any one of such services may, for example, communicate signals having data transfer rates of up to 50 Mb/s or more.

In order to effectively serve a large number of customers, a broadband network includes switching nodes. At switching nodes, broadband signals are routed along selected paths so that desired signals are delivered from signal sources to targets.

Numerous problems are faced by a broadband, real-time switch that accommodates a large number of connections. These problems result, at least in part, from the high data transfer rates associated with broadband communications. In short, a tremendous amount of data need to be processed or otherwise transferred through the switch during every unit of time, and the larger the number of connections supported by the switch, the greater the amount of data which need to be processed.

Conventional signaling protocols are often implemented in communications networks to eliminate or simplify the design effort that would otherwise be required. Standard signaling protocols may also provide a measure of reliability and compatibility with other communications systems. Unfortunately, operating speed, efficiency and user-friendliness may be sacrificed when such conventional protocols are rigidly followed.

Conventional signaling protocols, such as Q.931, are not designed to efficiently accommodate broadcast-like video switching. When operating to provide broadcast-like video programming, a broadband network may be required to process numerous control messages from any number of customer locations. Any given customer location may include more than one television (or other receiving equipment) that can interact with the network to obtain video programming. Typically, each piece of customer receiving equipment is an independently signaled entity, i.e., there is no intercommunication between individual receivers located at the same customer location.

Networks that utilize conventional signaling protocols, such as the Q.931 protocol, may be incapable of supporting various user-friendly features. For example, conventional Q.931 signaling does not allow one receiving unit to "bridge" onto or "merge" with a video program currently being viewed at a first receiving unit without independently identifying the video program to the network switch. This feature may be desirable when, for example, a customer viewing an upstairs television set wishes to conveniently switch channels to view whatever program is currently being viewed at a downstairs television set.

Conventional signaling protocols identify video programs and other communication signals with identification codes, addresses, and/or subaddresses. Although the identity of a received video program may be known at the receiving unit communicating with the network switch, other receiving units located at the same customer premises do not have access to the program identity. When the video program is obtained from a remote video source through network interaction there may be no program identification at all. It may be difficult if not impossible to perform program bridging or merging under such circumstances.

Video program bridging or merging may be crudely realized by splitting a signal after it has been received at a first receiving unit. Unfortunately, control of the video program remains at the first receiving unit, and any interconnected receiving units become mere satellite viewing stations. For example, the bridged video program is not maintained at any other receiving units if the user switches video programs at the first receiving unit. Furthermore, the bridged video program is lost at all receiving units if the first receiving unit is shut down.

SUMMARY OF THE INVENTION

Accordingly, it is an advantage of the present invention that an improved broadband switch that manages communication signal traffic between a remote switching module and at least one customer site is provided.

Another advantage is that the present invention provides operating methods for the broadband switch that are compatible with a conventional signaling protocol.

A further advantage is that the present invention provides a broadband switch that responds to a request from a second customer unit to view a video program that is currently being delivered to a first customer unit.

Another advantage of the present invention is that a second customer unit can access a video program currently being delivered to a first customer unit without having to identify the video program to the broadband switch.

Another advantage of the present invention is that it provides a broadband switch that maintains a bridged video program at a customer unit after terminating delivery of the video program at an originating customer unit.

The above and other advantages of the present invention are carried out in one form by a broadband video switch that manages communication signal traffic between a remote switching module and at least one customer site having first and second customer units. The switch includes means for receiving a plurality of communication signals, such as video programs. The switch also has means for obtaining a message from the second customer unit. The message is configured to identify the first customer unit. The switch incorporates a plurality of switching modules configured to deliver one of the communication signals to the second customer unit when that communication signal is currently being delivered to the first customer unit.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
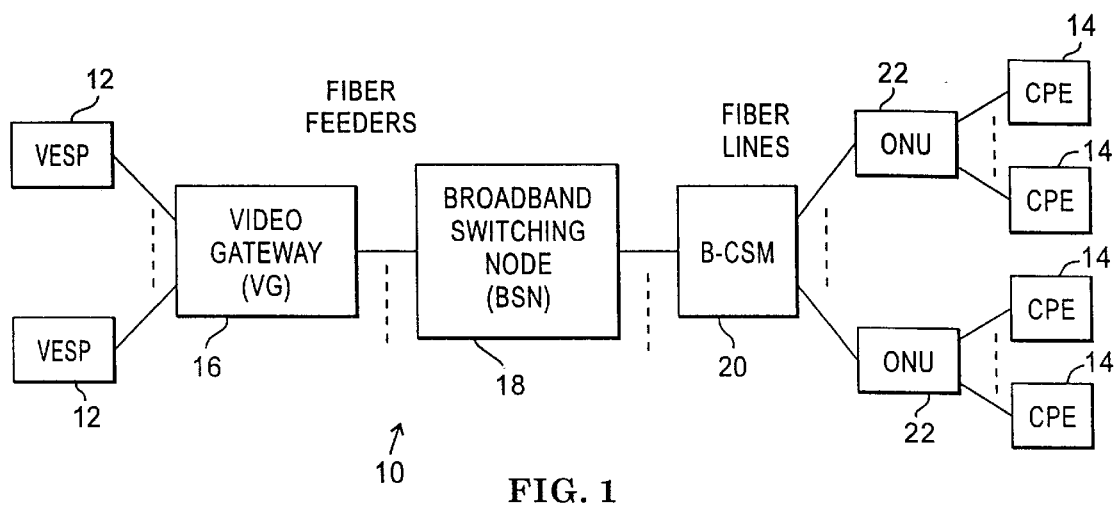
FIG. 1 shows a block diagram of a broadband network with which a broadband customer service module (B-CSM) configured in accordance with the present invention may operate.

FIG. 1 shows a block diagram of a broadband network 10. Any number of video enhanced service providers (VESPs) 12 and any number of customer premise equipment (CPE) 14 may couple to and communicate through network 10. VESPs 12 may, for example, provide broadcast-like video services, where video from a single source is "broadcast" to many targets, or VESPs 12 may provide video program libraries which customers may access on demand. Such broadcast-like services are expected to be in high demand, and in the preferred embodiments network 10 accommodates a greater amount of downstream traffic (i.e. toward CPEs 14) than upstream traffic (i.e. away from CPEs 14). Network 10 primarily transports digital data. Conventional codex equipment (not shown) may be used to convert NTSC-compatible and HDTV video into digital streams.

VESPs 12 couple to network 10 through one or more video gateways 16. Gateways 16 couple through any number of broadband switching nodes 18 to any number of broadband customer service modules (B-CSMs) 20, and B-CSMs 20 couple to CPEs 14 through optical network units (ONUs) 22. An exemplary CPE 14 is discussed below.

Network 10 is a fiber optic network, with optical signals being demultiplexed and converted into electrical signals (and vice versa) in ONUs 22. ONUs 22 couple to CPEs 14 through coax cables, and each ONU 22 serves a few, for example three, CPEs 14 for each optical line. Fiber optic lines couple ONUs 22 to B-CSMs 20, and fiber optic feeders couple B-CSMs 20 to upstream network nodes, such as switching nodes 18. In the preferred embodiment, the fiber optic lines and feeders conform to well known SONET OC-12 protocols. In a preferred embodiment, each B-CSM 20 may serve up to 288 fiber lines, with each line conveying 12 STS-1 51.84 Mb/s channels. In addition, each B-CSM 20 may support up to 288 SONET OC-12 downstream feeders and up to 72 SONET OC-12 upstream feeders. Accordingly, B-CSMs 20 may accommodate a large number of connections, with STM circuit switching being performed at an STS-1 rate. Although B-CSM 20 is configured for compatibility with STM signals, nothing prevents B-CSM 20 from utilizing Asynchronous Transfer Mode (ATM) protocols for call processing and/or circuit switching of ATM signals.

Signaling from CPEs 14 to network 10 is accomplished via a SONET datacom channel in the line operating at around 576 Kb/s using a variation of the Q.921 and Q.931 protocols. The variations of the Q.931 protocol included in network 10 include a MODIFY message to which B-CSM 20 responds with any acknowledgment and often without further network involvement. The MODIFY message applies when a customer is currently receiving a broadcast-like video program channel. It specifies a new broadcast-like video program channel to receive. When B-CSM 20 receives a MODIFY message from a CPE 14, it controls its switching circuits to route the new video program channel to the CPE 14 and then returns an acknowledgment after the new video program channel has been connected. Switching time improves because this process is quicker than the conventional disconnect sequence of messages followed by the conventional connect sequence of messages. Also, the switching time often improves because further network involvement such as rebuilding a new connection can often be omitted if the new channel is already available at a B-CSM 20, having already been provided by the network to the B-CSM 20 for connection to another CPE 14. When the new channel is already available at the B-CSM 20, the B-CSM 20 routes it to the CPE 14 from the switching circuit that is most closely associated with the CPE 14 so as to minimize the switching circuit resources that are used to make the connection. Another variation of the Q.931 protocol, which allows a second customer unit to conveniently receive the same video program currently being delivered to a first customer unit, is described below.

While the teaching of the present invention may apply to different types of nodes in network 10, the following description focuses upon a preferred embodiment of a B-CSM 20. B-CSM 20 may be viewed as analogous to a local switching system or a remote local switching module for the current voice network because B-CSM 20 in network 10 is the first switch away from customer equipment in a hierarchy of switches.

Figure 2:
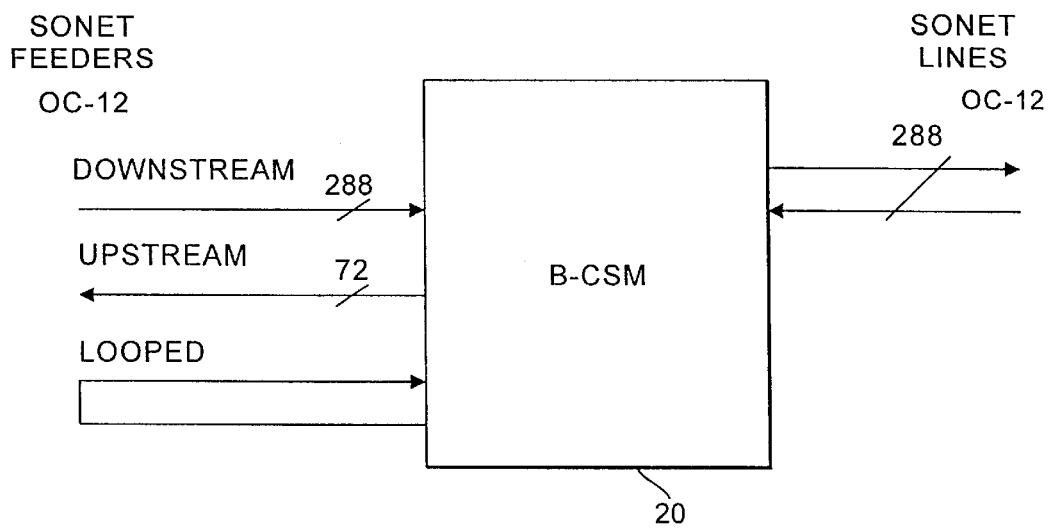
FIG. 2 shows a block diagram depicting an external configuration for the broadband customer service module.

FIG. 2 shows a block diagram depicting an external configuration for the preferred embodiment of B-CSM 20. Up to 288 OC-12 SONET bidirectional fiber lines may couple B-CSM 20 to various ONUs 22 (see FIG. 1). Up to 288 downstream OC-12 SONET fiber feeders and up to 72 upstream OC-12 SONET fiber feeders may couple B-CSM 20 to various broadband switching nodes 18 (see FIG. 1), or other upstream network nodes. However, a portion of the upstream feeders may be looped back to downstream feeders at B-CSM 20 so that line-to-line connections may be switched entirely within B-CSM 20. Even if upstream feeders are not looped back to downstream feeders, line-to-line connections downstream of B-CSM 20 may take place through looping which may take place further upstream.

Figure 3:
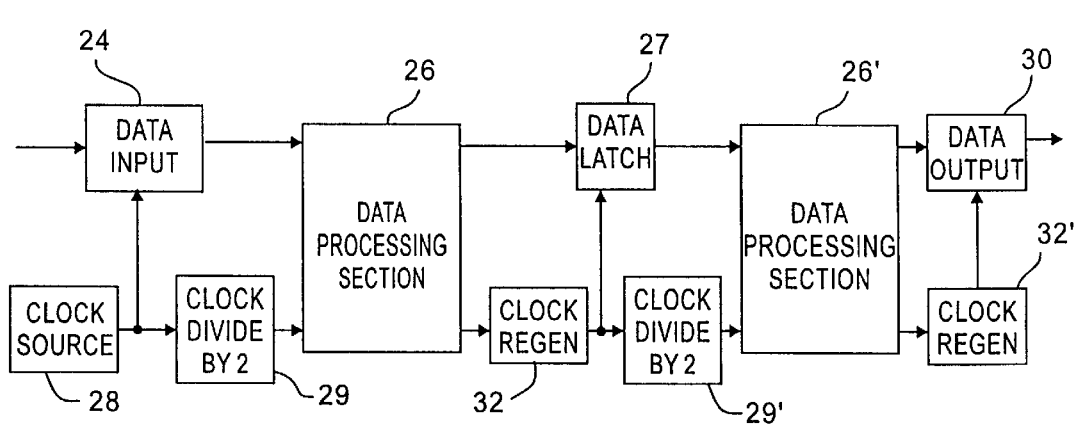
FIG. 3 shows a high level block diagram of the broadband customer service module.

FIG. 3 shows a high level block diagram of a B-CSM 20. As illustrated in FIG. 3, B-CSM 20 has data inputs 24 at which SONET data from a SONET line are received and demultiplexed into individual STS-1 data streams. These data are passed to data processing sections 26 and 26', each of which processes the data and imposes some delay on the data as a consequence, although not necessarily an intended or desired consequence, of the processing. B-CSM 20 also has data outputs 30 at which multiplexed STS-1 data streams are received and multiplexed into SONET data for a SONET line. As discussed above, B-CSM 20 includes data inputs for both upstream and downstream directions. In the preferred embodiment of the present invention, the data processing corresponds to circuit switching, and more precisely to circuit switching which takes place in a two stage space switch arrangement, with the two stages corresponding to data processing sections 26 and 26', respectively. Portions of input data are switched into portions of output data. However, other types of data processing activities also impose delays while processing data and can benefit from the teaching of the present invention.

A clock source 28 produces a full-rate clock which oscillates at a frequency which is the same as the data rate. In other words, the full-rate clock undergoes one full cycle between high and low states in one datum period, baud, or symbol. The full-rate clock is used to clock data out of the data inputs 24, and it connects to a clock divide by two circuit 29 which produces a half-rate clock reference. In the preferred embodiment, this half-rate clock reference oscillates at one-half the data rate so that it resembles an alternating stream of ones and zeros occurring at the data rate. In other words, the reference clock changes state only once for each datum period, baud, or symbol. This arrangement contrasts with conventional digital circuits where clocks may operate at a data rate, change state twice per datum period, baud, or symbol, and operate as a clock for the data streaming through a processor at the data rate. Clock divide by two circuit 29 couples to the input of data processing section 26, where the reference clock joins the data from data input 24. Then, data processing section 26 processes the reference clock along with the input data so that the reference clock receives approximately the same delay imposed upon the data.

In the preferred embodiment, data processing section 26 is implemented using standard CMOS design practices. The data rate is STS-1, or 51.84 Mb/s. The reference clock's frequency is 25.93 Mc/s so that the reference clock is a stream of alternating ones and zeros at the STS-1 rate.

A data output of data processing section 26 couples to a data latch 27 so that the processed and delayed, and in this case the switched, data are presented to an input of a data latch 27. The delayed clock reference output from data processing section 26 couples to a clock regeneration (CLOCK REGEN) circuit 32. Clock regeneration circuit 32 is a phase locked loop circuit that regenerates a master clock signal which is at twice the frequency of the data rate and is phase synchronized to the delayed reference clock. This master clock couples to a clock input of data latch 27 so that the master clock clocks the processed data into data latch 27. By having the reference clock and the data experience approximately the same delays through data processing section 26 and by regenerating a master clock from the delayed reference clock, bit synchronization for extracting data at data latch 27 may be maintained.

This data transfer process from data input 24 through data processing section 26 to data latch 27 is repeated from data latch 27 through data processing section 26' to data output 30. Once again, a half-rate clock reference is created by a clock divide by two circuit 29' and carried through data processing section 26' along with the data. A full-rate master clock is then regenerated by clock regeneration circuit 32'.

Figure 4A:
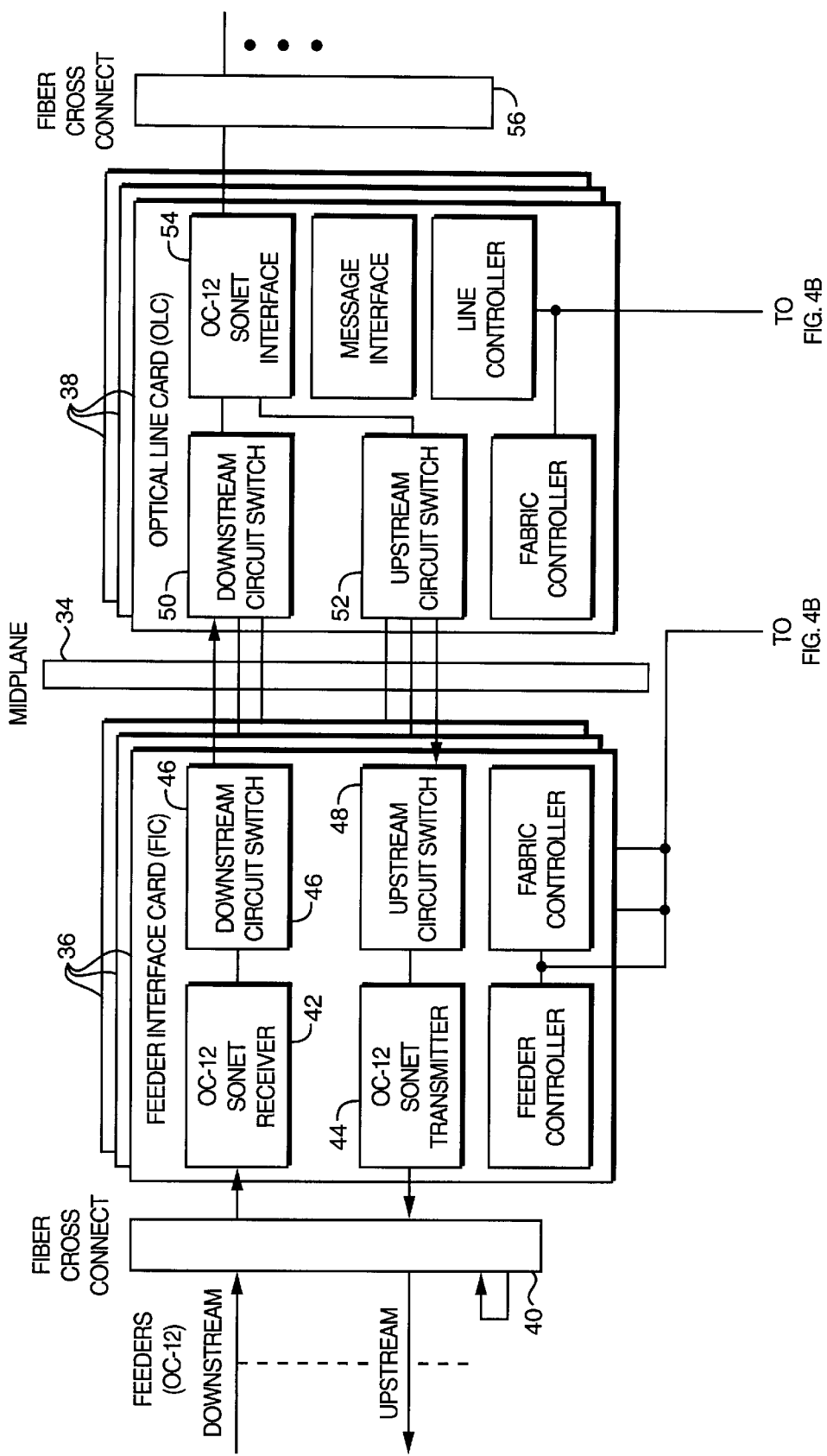
FIG. 4 shows a more detailed block diagram of the broadband customer service module.
Figure 4B:
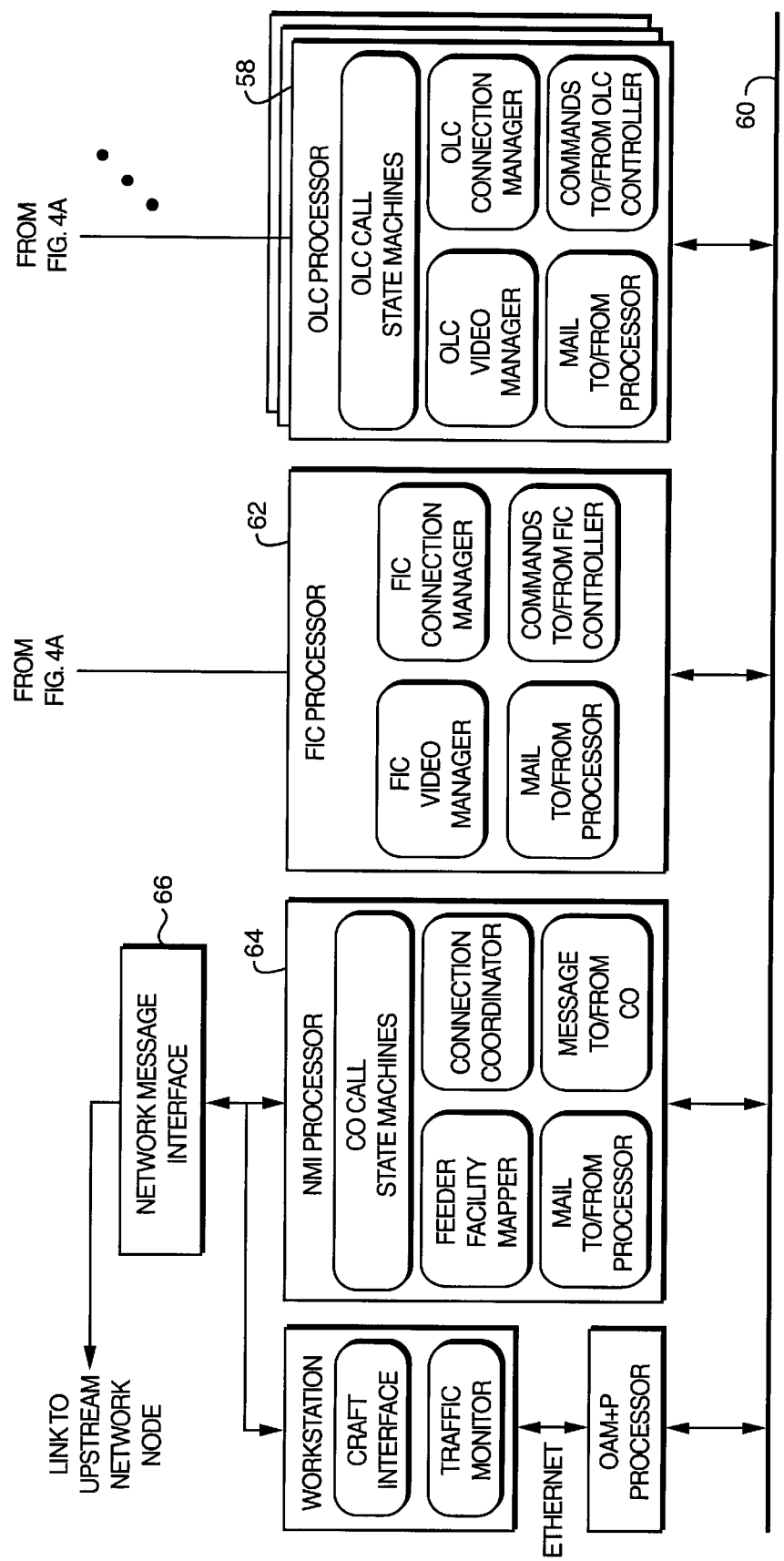

FIG. 4 shows a more detailed block diagram of B-CSM 20. B-CSM 20 is configured upon a midplane assembly 34 which arranges a plurality of feeder interface cards (FICs) 36 substantially perpendicular to a plurality of optical line cards (OLCS) 38. Each FIC 36 couples to every OLC 38 at connection points through junctor groups between the FIC 36 and respective OLCs 38. Likewise, each OLC 38 couples to every FIC 36 at connection points through junctor groups.

Downstream feeders couple through a fiber cross connect 40 to OC-12 SONET receivers 42 on each FIC 36. OC-12 SONET transmitters 44 on each FIC 36 couple through cross connect 40 to upstream feeders. Receiver 42 and transmitter 44 couple through downstream and upstream circuit switch fabrics 46 and 48 and midplane assembly junctor groups to downstream circuit switch fabrics 50 and upstream circuit switch fabrics 52, respectively. Downstream and upstream circuit switches 50 and 52 on OLCs 38 couple through an OC-12 SONET interface 54 and a fiber cross connect 56 to the ONU 22 downstream lines (see FIG. 1). Those skilled in the art will appreciate that for downstream signals, switch fabrics 46 provide first stage switching and switch fabrics 50 provide second stage switching. Likewise, for upstream signals, switch fabrics 52 provide first stage switching and switch fabrics 48 provide second stage switching. Of course, between each first stage and second stage numerous junctors connect many switch fabrics to many other switch fabrics.

In the preferred embodiment, midplane assembly 34 supports up to 18 of FICs 36 and up to 18 of OLCs 38. Up to 9072 junctors perform the interconnections between switching stages. Each FIC 36 is desirably identical to the other FICs 36, and each OLC 38 is desirably identical to the other OLCs 38. Thus, for design, manufacturing, inventory, engineering, troubleshooting, and maintenance, cost savings result from having fewer modules with which to contend. These junctors are arranged into up to 324 junctor groups. Each junctor group supports up to 24 downstream junctors and 4 upstream junctors. Consequently, B-CSM 20 accommodates up to 3456 STS-1 downstream connections and up to 864 STS-1 upstream connections.

OLC processors 58 couple to corresponding OLCs 38 through, for example, well known VSB busses. Likewise OLC processors 58 couple to a multiprocessor bus 60, such as the well-known VME bus. OLC processors 58 evaluate in-band signaling extracted from SONET lines, and control circuit switching taking place in OLCs 38. Signaling which cannot be resolved within OLC processors 58 and OLCs 38 is packetized and transmitted over bus 60. A FIC processor 62 couples to multiprocessor bus 60 and to all FICs 36. FIC processor 62 controls switching taking place in FICs 36. A network message interface (NMI) processor 64 responds to signaling packets and transfers such signaling upstream through a network message interface 66.

Figure 5:
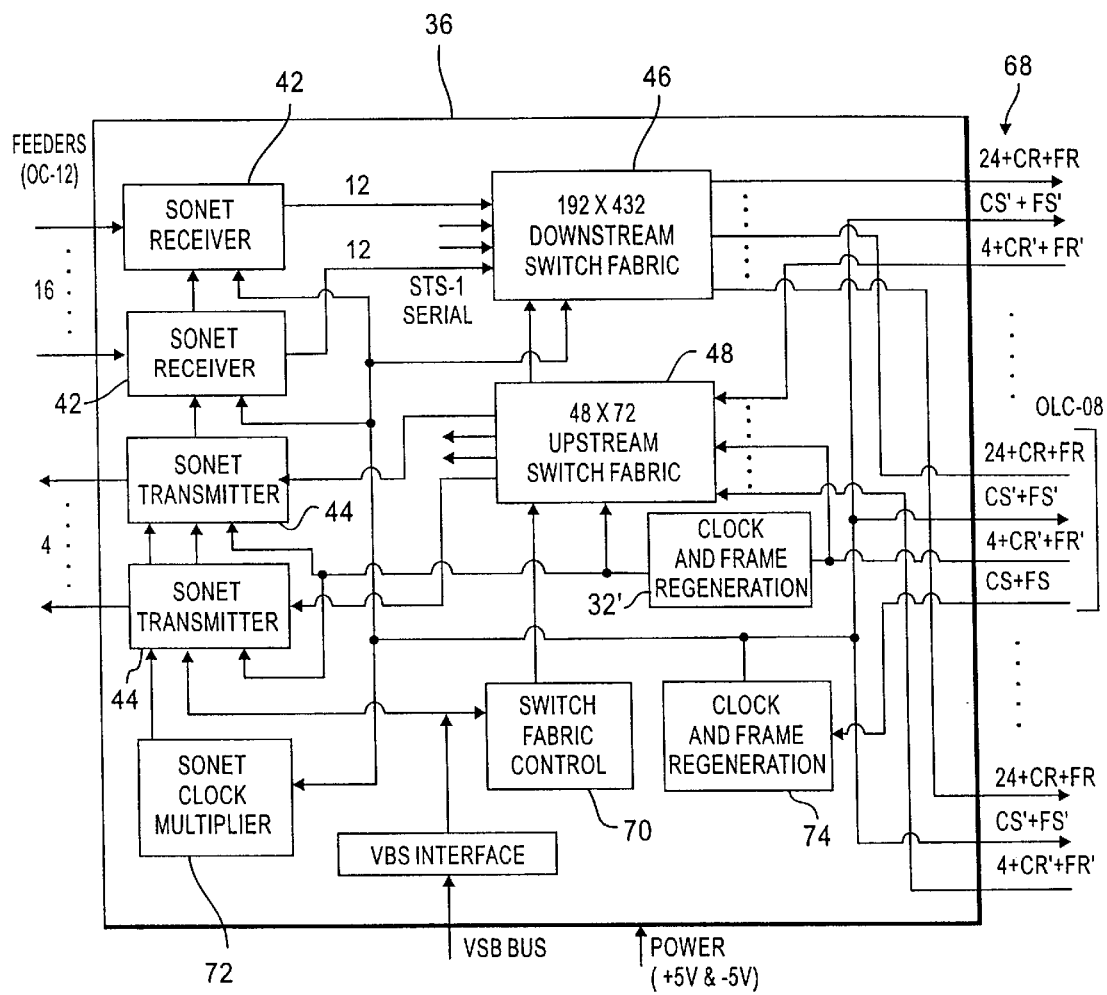
FIG. 5 shows a block diagram of a feeder interface card (FIC)

FIG. 5 presents a block diagram which illustrates a feeder interface card (FIC) 36 in more detail. Each FIC 36 may include several OC-12 SONET receivers 42, up to 16 in the preferred embodiment. Likewise, FIC 36 includes several OC-12 SONET transmitters 44, up to 4 in the preferred embodiment. Receivers 42 demultiplex STS-1 channels from the SONET feeders, convert the data into electrical signals, and couple the individual STS-1 channels to inputs of downstream switch fabric 46, which is configured as a 192×432 fabric in the preferred embodiment. Output signals from switch fabric 46 are routed through junctor groups 68, through which they pass to all OLCs 38 (see FIG. 4).

SONET transmitters 44 multiplex the STS-1 channels they receive from upstream switch fabric 48 into SONET optical signals for transmission over the upstream feeders. In the preferred embodiment, upstream switch fabric 48 is configured as a 48×72 fabric which receives four signals from OLCs 38 through each of 18 junctor groups 68. The configuration of switching occurring through fabrics 46 and 48 from moment to moment is controlled through a switch fabric control block 70, which is controlled by FIC processor 62 (see FIG. 4).

Figure 6:
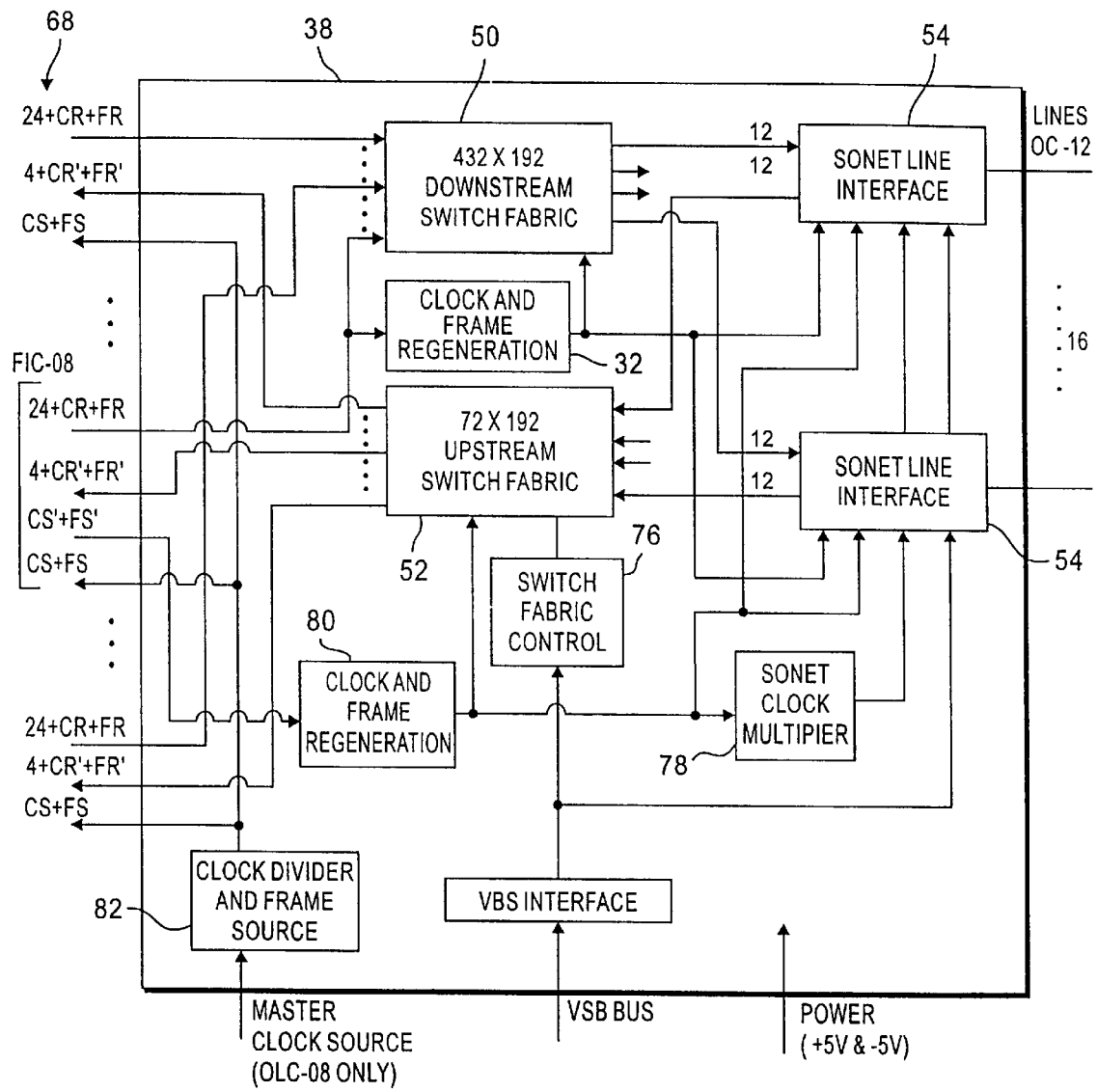
FIG. 6 shows a block diagram of an optical line card (OLC)

FIG. 6 presents a block diagram which illustrates an optical line card (OLC) 38 in more detail. Each OLC 38 may include several OC-12 SONET interfaces 54, up to 16 in the preferred embodiment, for connection to the lines. Interfaces 54 demultiplex STS-1 channels from the SONET lines, convert the data into electrical signals, and couple the received individual STS-1 channels to inputs of upstream switch fabric 52, which is configured as a 72×192 fabric in the preferred embodiment. Likewise, interfaces 54 multiplex electrical STS-1 channels received from downstream switch fabric 50 onto the optical SONET lines. Downstream switch fabric 50 is configured as a 432×192 fabric in the preferred embodiment. Output signals from upstream switch fabric 52 are routed through junctor groups 68, through which they pass to all FICs 36 (see FIG. 4). Input signals from FICs 36 couple through junctor groups 68 to downstream switch fabric 50. The configuration of switching which occurs through fabrics 50 and 52 from moment to moment is controlled by a switch fabric control block 76, which is controlled by an OLC processor 58 (see FIG. 4).

A master clock source (not shown) connects only to the clock divider and frame source circuit 82 on the OLC 38 located in the middle of midplane assembly 34 (see FIG. 4). This centrally located OLC 38 is designated as OLC-08. Circuits 82 are inactive on all other OLCs 38. The master clock source may be synchronized to an external reference source, as is conventional for SONET equipment. Clock divider and frame source circuit 82 outputs a half-rate "clock source" signal CS and SONET "frame source" signal FS to all FICs 36 via the appropriate junctor groups. The SONET frame source signal is used to synchronize when all SONET frames are output from the B-CSM 20 and its position is otherwise arbitrary.

Referring to FIGS. 5 and 6, clock and frame regeneration circuits 74 on all FICs 36 receive the clock source CS and frame source FS signals from OLC-08. On each FIC 36, clock and frame regeneration circuit 74 provides both full rate and half-rate clocks and a frame reference signal (FR), which are distributed to all SONET receivers 42, to downstream switch fabric 46, and to a SONET-clock multiplier 72.

SONET receivers 42 use the full rate clock and the frame reference signal to input or otherwise extract data from SONET OC-12 fibers. As one skilled in the art would understand, SONET pointer-processing functions are done on each STS-1 signal using the frame and pointer as received and the frame reference signal.

Downstream switch fabric 46 uses the full-rate clock to clock-in data from the SONET receivers 42 and to clock it out to OLCs 38 via junctor groups 68. Fabric 46 also distributes the half-rate clock reference signal CR and the frame reference signal FR along with data to each OLC 38 that is connected to its output. The CR, FR and data signals which connect to each OLC are aligned as they leave the downstream switch fabric 46.

SONET clock multiplier 72 multiplies the STS-1 full-rate clock by 12 to give a 622.08 MHz clock which is provided to all SONET transmitters 44. One skilled in the art will understand that SONET transmitters 44 are designed so that the phase of this 622.08 MHz clock can be any stable value.

On the FIC 36 located in the middle of the midplane assembly, designated as FIC-08, clock and frame regeneration circuit 74 also provides half-rate clock CS' and frame source FS' signals to all OLCs 38 via the appropriate junctor groups 68.

A clock and frame regeneration circuit 80 on each OLC 38 receives clock source CS' and frame source FS' signals from FIC-08. On an OLC 38, clock and frame regeneration circuit 80 provides both full-rate and half-rate clocks and a frame reference signal, which are distributed to the receivers in all SONET line interfaces 54, to the upstream switch fabric 52, and to a SONET clock multiplier 78.

Receivers (not shown) in SONET line interfaces 54 use the full rate clock and the frame reference signal to receive or otherwise extract data from SONET OC-12 lines. Those skilled in the art will understand that SONET pointer-processing functions are done on each STS-1 signal using the frame and pointer as received and the frame reference signal.

Upstream switch fabric 52 uses the full rate clock to clock-in data from the receiver in the SONET line interfaces 54 and to clock data out to FICs 36 via junctor groups 68. Upstream switch fabric 52 also distributes the half-rate clock reference signal CR' and the frame reference signal FR' along with data to each FIC 36 which is connected to its output. The CR', FR' and data signals which connect to each FIC 36 are aligned as they leave the upstream switch fabric.

SONET clock multiplier 78 multiplies the full rate clock by 12 to give a 622.08 MHz clock which is provided to all transmitters (not shown) in SONET line interfaces 54. As one skilled in the art can understand, the SONET transmitters are designed so that the phase of this 622.08 MHz clock can be any stable value.

Downstream data signals are input to the B-CSM 20 at SONET receiver 42 on FICs 36, switched first by downstream switch fabrics 46 on FICs 36, switched second by downstream switch fabrics 50 on OLCs 38, and then output from the B-CSM 20 by transmitters in SONET line interfaces 54 on OLCs 38.

In a similar manner, upstream data signals are input to the B-CSM 20 at receivers in the SONET line interfaces 54 on OLCs 38, switched first by upstream switch fabrics 52 on OLCs 38 switched second by upstream switch fabrics 48 on FICs 36, and then output from the B-CSM 20 by SONET transmitter 44 on FICs 36.

Only the processing of downstream data signals will be described below in detail; however, those skilled in the art will understand that the processing of upstream data is done in a similar manner. Referring to FIG. 5, downstream data signals are transferred on each FIC 36 from a SONET receiver 42 to downstream switch fabric 46 using the full rate clock from clock and frame regeneration circuit 74. Downstream data signals are transferred from all downstream switch fabrics 46 on all FICs 36 via junctors to all downstream switch fabrics 50 on all OLCs 38 (see FIG. 6).

Referring to FIG. 6, on each OLC 38 clock and frame regeneration circuit 32 receives the half-rate clock reference signal CR and frame reference signal FR from FIC-08. Circuit 32 regenerates these signals and outputs a full-rate clock and a frame reference signal to downstream switch fabric 50 and to transmitters in all SONET line interfaces 54. Downstream switch fabric 50 uses the full-rate clock to clock-in data from the FICs 36 via the junctors. Transmitters in SONET line interfaces 54 use the full-rate clock to clock-in data from the downstream switch fabric 50 and they use the frame reference signal to set their SONET output framing. Thus, the downstream data signals are transferred on each OLC 38 from downstream switch fabric 50 to all transmitters in SONET line interfaces 54 using the full rate clock from clock and frame regeneration circuit 32.

When downstream data signals are transferred from all downstream switch fabrics 46 in FICs 36 via junctors to a downstream switch fabric 50 on an OLC 38, data signals are aligned with the clock reference signal CR at the input to the downstream switch fabric 50, even though the data and clock reference signals may have traversed different path lengths between the fabrics. Geometric compensation is used to assure that all data signals are aligned with the clock reference signal CR by assuring that the path length for each data or clock signal back to the master clock source is substantially the same.

Figure 7:
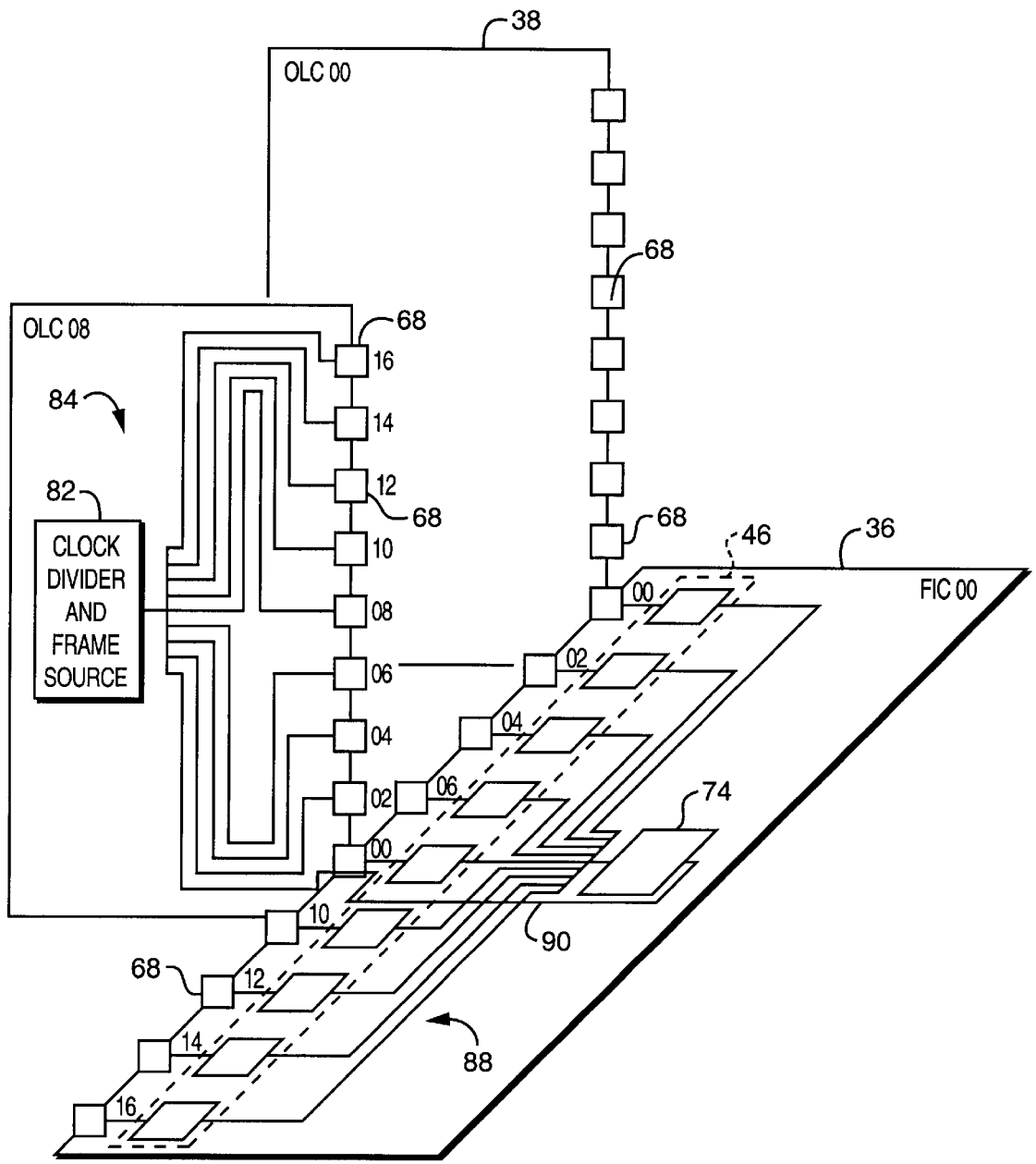
FIG. 7 shows a schematic representation of geometric compensation applied to reference clock signals in optical line cards and feeder interface cards for downstream switching.
Figure 8:
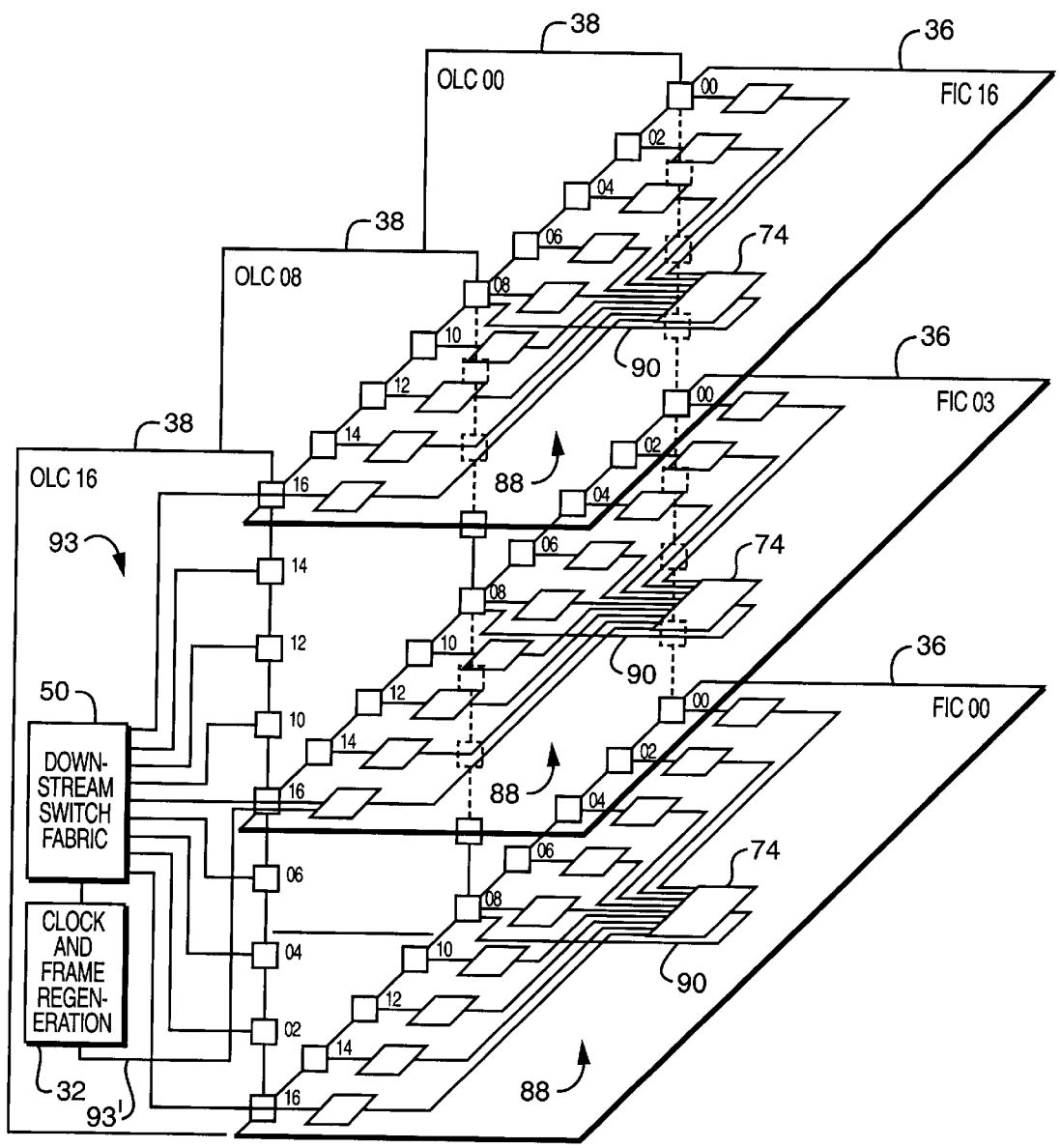
FIG. 8 shows a schematic representation of geometric compensation applied to data signals in feeder interface cards and optical line cards for downstream switching.

FIGS. 7 and 8 show a schematic representation of geometric compensation applied to signals in OLCs 38 and FICs 36 for downstream switching. For the sake of clarity, FIGS. 7 and 8 omit a similar representation which is employed in reverse for upstream switching. However, those skilled in the art will appreciate that the below-presented discussion which applies to downstream switching applies in reverse to upstream switching.

The purpose of the geometric compensation is to align the reference clock to corresponding data so that a regenerated master clock will have the correct phase synchronization to appropriately clock data into second stage fabrics and subsequent latches. All data and reference clock signals are desirably transported through OLCs 38 and FICs 36 using a 50 ohm trace configuration. To preserve noise immunity and reduce power consumption, accessory source and/or destination termination networks are omitted. The data or reference clocks propagate through these signal paths at around the speed of light, and signal paths of varying lengths lead to propagation delays of varying duration.

A master clock source starts at a physical point within B-CSM 20 and is be distributed throughout B-CSM 20 to the various locations where it then mates with data. As discussed above, the master clock is first converted to a one-half frequency reference clock signal which is distributed throughout B-CSM 20, then regenerated. Due to the vast amount of data processed by B-CSM 20, these locations are spread throughout B-CSM 20, so that varying amounts of propagation delay may be experienced by reference clocks just in transporting the reference clocks to locations where they mate with data. Likewise, the data passing between first and second stage switch fabrics may traverse signal paths of varying lengths. Consequently, data streams being collected together in second stage switch fabrics may have different timing skews associated therewith.

FIG. 7 illustrates a B-CSM 20 configured to support up to 9 FICs 36 and up to 9 OLCs 38. Each OLC 38 and FIC 36 is referenced using an even suffix number in the range of 00–16. However, FIG. 7 shows only OLC-00 and OLC-08 with FIC-00 for clarity. OLCs are aligned so that OLC-08 is in the center of all OLCs. Each OLC includes clock divider and frame source circuit 82 (see FIG. 6) and signal path pattern 84, but circuit 82 and pattern 84 are active only on OLC-08. Pattern 84 distributes the clock source signal CS from clock divider and frame source circuit 82 to all junctor groups 68 through signal paths of varying lengths in pattern 84. In the version of pattern 84 illustrated in FIG. 7, the signal path to the center junctor group 68 for OLC-08 is the longest path, while the signal paths to the outside junctor groups 68 are the shortest signal paths.

Each FIC 36 includes a signal path pattern 90 and signal path pattern 88. Pattern 90 receives the clock source signal CS from OLC-08 via its center junctor group 68 and routes the clock source signal CS to clock divider and frame source circuit 74. Reference clocks which may be available at non-center junctor groups 68 on FICs 36 are ignored. Since FICs 36 are identical to one another, the reference clock follows equivalent length paths over path pattern 90 on all FICs 36. From clock and frame regeneration circuit 74, the clock source signal CS is distributed to all portions of downstream switch fabric 46 over signal path pattern 88. The downstream switch fabric 46 adds the data, and then the reference clock and data pass together from fabric 46 to junctor groups 68. Each FIC 36 has the same pattern 88.

FIG. 8 illustrates the same pattern 88 shown in FIG. 7 along with a pattern 93 residing on OLC cards 38. Pattern 84, discussed above in connection with FIG. 7 is omitted in FIG. 8 for clarity. Data from junctor groups 68 are routed to a downstream switch fabric 50 along signal paths of varying lengths following pattern 93. A reference clock from FIC-08 is routed using a signal pattern 93' to clock and frame regeneration circuit 32, which regenerates an aligned full-rate clock. At downstream switch fabric 50 the data are clocked into the switch fabric using the clock from clock and frame regeneration circuit 32. In the preferred embodiments, the delays of corresponding signal paths from patterns 84 and 93 approximately equal the same constant value for each junction group 68. The varying lengths of pattern 84 compensate for the varying lengths of pattern 93.

The clock path from clock divider and frame source circuit (see FIG. 6) 82 on OLC-08 (see FIG. 6) to the clock input at the downstream switch fabric 50 on a particular OLC 38 always includes patterns 84 on OLC-08, plus pattern 90 and 88 on FIC-08, plus pattern 93' on the particular OLC 38. The clock and data path from clock divider and frame source circuit 82 on OLC-08 to any data input at the downstream switch fabric 50 on a particular OLC 38 always includes patterns 84 on OLC-08, plus patterns 90 and 88 on the appropriate FIC 36, plus pattern 93 on the particular OLC.

Since the delays of the corresponding signal path from patterns 84 and 93' are always equal for each FIC, and since pattern 90 and 88 are the same on each FIC, the delays of all clock-only and clock and data paths are roughly equal.

Figure 9:
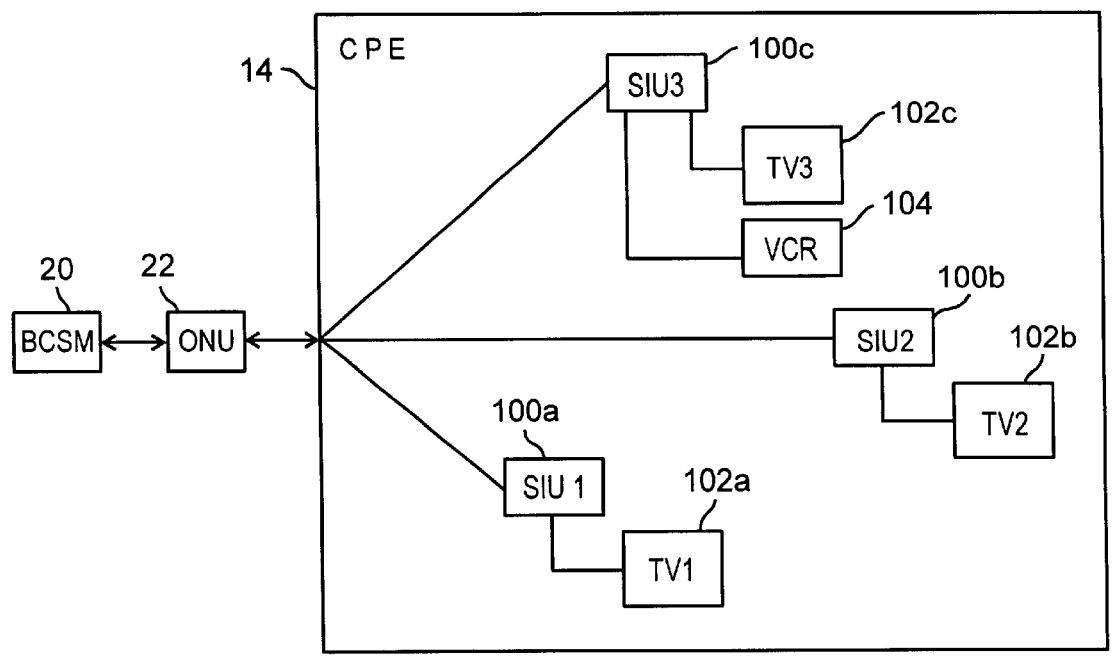
FIG. 9 shows a block diagram of customer premise equipment (CPE)

As discussed briefly above, B-CSM 20 utilizes a variation of the Q.931 signaling protocol to enable a second customer unit to conveniently request connection to the same video program currently being delivered to a first customer unit. For purposes of this description, this switching feature is referred to as program "merging" or program "bridging." With reference to FIG. 9, an exemplary CPE 14 (see FIG. 1) is illustrated. CPE 14 may be a home, an office building, or any other customer site with equipment configured to communicate with network 10.

Any number of subscriber interface units (SIUs) 100 associated with the particular CPE 14 are connected to ONU 22. Likewise, ONU 22 is connected to the B-CSM 20 associated with this particular broadband network 10 (see FIG. 1). Each SIU 100 may communicate with any number of customer units, such as televisions, audio receivers, VCRs, computer monitors, and/or video cameras. For example, a television, TV1, 102a is shown connected to an SIU 100a. Likewise, a television, TV2, 102b is shown connected to an SIU 100b, while a television, TV3, 102c and a VCR 104 are both connected to an SIU 100c. In the preferred embodiment, final switching is performed at B-CSM 20 and each SIU 100 receives only those video programs intended for an associated customer unit such as a television, VCR, etc.

Each customer unit, such as televisions 102 or VCR 104, associated with their respective SIU 100 located at CPE 14 has a unique subscriber address. A subscriber address preferably includes a subscriber number in conjunction with a unit subaddress. Each CPE 14 is preferably associated with the same subscriber number, and all customer units within the same CPE 14 are partially identified by the same subscriber number. However, each customer unit associated with a given CPE 14 has a different unit subaddress that uniquely identifies it.

In the preferred embodiment, SIUs 100 send and receive signaling messages to and from B-CSM 20 during processing and delivery of video programs and other communication signals. For example, in response to a user request to view a particular video program at TV2 102b, SIU 100b sends a SETUP message to B-CSM 20. The message typically includes the identifying subscriber address such that B-CSM 20 can route the video program through SIU 100b to television 102b.

In accordance with conventional Q.931 signaling, each SIU 100 is an independently signaled entity. In other words, there is no intercommunication between SIUs 100, and video programs are delivered to each SIU 100 over separate communication channels. Consequently, if a video program is currently being delivered to SIU 100a, then SIUs 100b and 100c do not have access to the identity of that video program. Communications networks often identify video programs by some type of identification code. In the preferred embodiment, most video programs are identified by an identification code that includes a provider identifier for VESP 12 (FIG. 1), in conjunction with a subaddress identifier which identifies the video program channel number.

Figure 10:
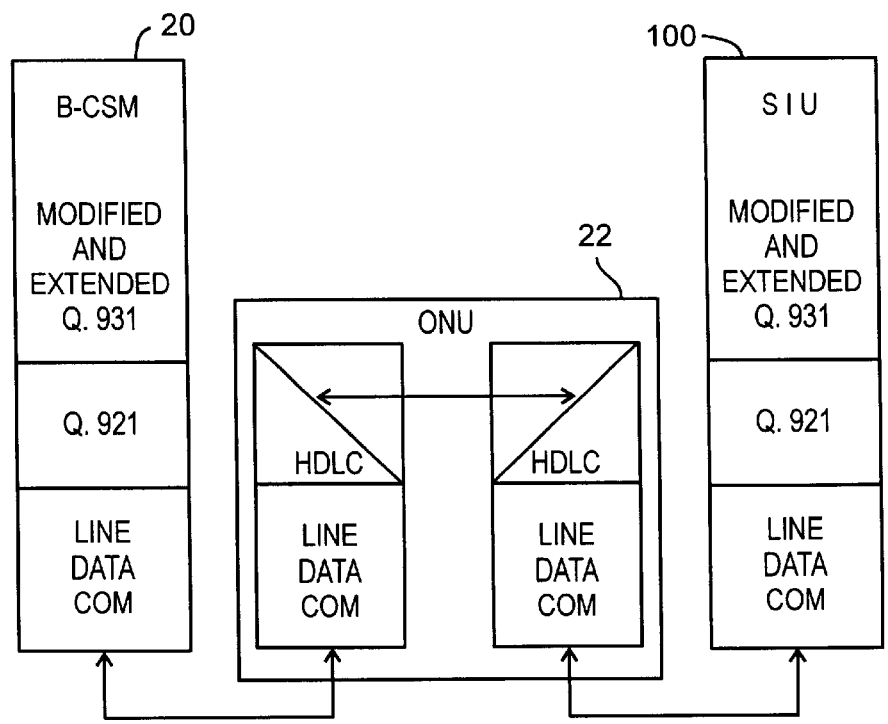
FIG. 10 shows a signaling protocol chart.

FIG. 10 illustrates a signaling protocol stack adapted for use in the preferred embodiment of the present invention. Through this protocol stack, B-CSM 20 communicates with SIU 100. In conventional signaling applications, Q.931 signaling protocol describes what goes into a signaling packet and defines the message type and format. A modified and extended Q.931 protocol resides at the top of the stack. A Q.921 protocol defines the Integrated Services Digital Network (ISDN) frame format at the data link layer and contains address information. HDLC is a link layer protocol standard for point-to-point and multi-point communications. The preferred embodiment of the present invention modifies and extends Q.931 signaling protocol for performance with broadcast-like video, while Q.921 and HDLC remain unchanged. The modifications and extensions are implemented in software.

The program merge feature of the preferred embodiment utilizes the modified and extended Q.931 signaling protocol. This enables a user located at one customer unit to receive the video program currently being delivered to a different customer unit without having to identify the provider identifier or the subaddress identifier associated with the video program.

Figure 11:
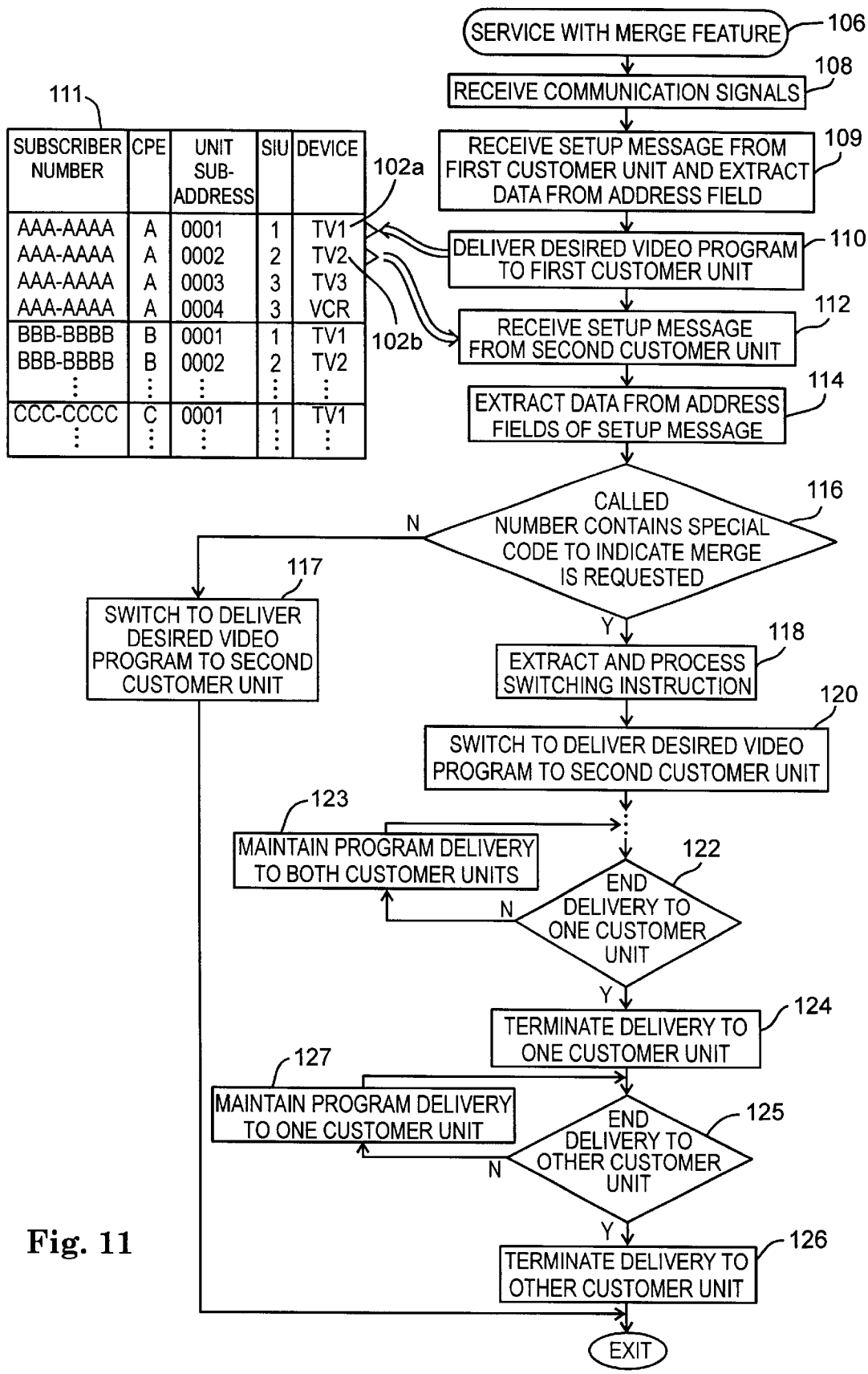
FIG. 11 shows a flow diagram of a merge process performed by the broadband customer service module.

With reference to FIG. 11, a service with merge feature process 106 performed by B-CSM 20 is illustrated as a flow diagram. For convenience, the following description of process 106 refers to CPE 14 illustrated in FIG. 9.

Merge process 106 begins with a task 108, during which B-CSM 20 receives a plurality of communication signals. As described above in connection with FIGS. 1, 2, and 4, FICs 36 receive the communication signals, or video programs, from various VESPs 12 via SONET feeder channels. In the preferred embodiment, most video programs are identified by an identification code configured as a provider identifier in conjunction with a subaddress identifier. B-CSM 20 and network 10 utilize the identification codes during call processing and program switching. However, some video programs that are obtained from remote sources through network interaction may not have any recognizable identification codes. Process 106 can be performed whether or not the video programs have associated identification codes.

Following task 108, a task 109 receives a SETUP message from a first SIU, e.g. SIU 100a (see FIG. 9) for a first customer unit, e.g. TV1 102a. In task 109, B-SCM 20 (see FIG. 9) then extracts data, such as an identification code, from an address field of the SETUP message to get a desired provider identifier (VESP 12) and a subaddress identifier for a desired video program channel. In addition, the SETUP message identifies the subscriber address for TV1 102a.

In response to task 109, a task 110 causes B-CSM 20 to deliver this desired video program to SIU 100a and subsequently to TV1 102a by utilizing the subscriber address. FICs 36 (see FIG. 4) and OLCs 38 (see FIG. 4) function as switching modules that route the video program to the applicable CPE 14 in response to a SETUP message. As described above, TV1 102a is preferably identified by a subscriber address that includes a subscriber number, which is common to all customer units located at CPE 14, in conjunction with a unit subaddress which is specific to TV1 102a.

An exemplary list of subscriber addresses 111 is illustrated in connection with task 110. Each subscriber number is associated with a common CPE 14 (labeled A, B, or C) in list 111 and each customer unit associated with an SIU 100 within any given CPE 14 is identified by a unique unit subaddress. For example, TV1 102a may be identified by the subscriber number AAA-AAAA in conjunction with the unit subaddress 0001 and TV2 102b may be identified by the subscriber number AAA-AAAA in conjunction with the unit subaddress 0002.

After task 110 is performed, the video program may be viewed at TV1 102a. Following task 110, while the video program is currently being delivered to SIU 100a and TV1 102a, a task 112 is performed. During task 112, B-CSM 20 receives a SETUP message from a second customer unit, e.g. TV2 102b, through a second SIU, e.g., SIU 100b.

In response to a received SETUP message in task 112, a task 114 extracts informational elements from the SETUP message for further processing. The informational elements within a conventional SETUP message typically include an identification code, i.e. the provider identifier and the subaddress identifier, identifying a desired video program channel. Additionally, the informational elements identify the subscriber number and the unit subaddress for a customer unit such as TV2 102b. The informational elements enable B-CSM 20 to properly route the video program to SIU 100b and TV2 102b.

In the preferred embodiment, the SETUP message contains a special code in a called address field of the SETUP message. This special code identifies the SETUP message to be a SETUP message with a MERGE request. The SETUP message with MERGE request is formatted as a conventional Q.931 call SETUP message, however, the SETUP message containing a MERGE request does not include the identification code for the video program channel. Instead, the MERGE request includes informational elements such as the subscriber address for the customer unit, such as TV2 102b, making the request and the subscriber address for another customer unit, such as TV1 102a.

Following task 114, a task 116 evaluates the extracted informational elements to determine if a MERGE request was obtained. Message interfaces incorporated into OLCs 38 (see FIG. 4) may be configured to receive the MERGE request along with various other signaling messages. The MERGE request is sent from SIU 100b when a user located at a customer unit such as TV2 102b desires to receive the same video program on TV2 102b that is being delivered to TV1 102a in task 110. The user at TV2 102b need not know the identity of the video program or the video channel to which TV1 102a is currently tuned.

If a MERGE request is not obtained in task 116, a task 117 processes the conventional Q.931 SETUP message and causes B-CSM 20 (see FIG. 9) to switch to deliver the desired video program to SIU 100b and TV2 102b.

When a MERGE request is received in task 116, a task 118 causes B-CSM 20 to extract and process a switching instruction from the received MERGE message. In the preferred embodiment, the switching instruction is incorporated in a Q.931 "called party subaddress" field. The called party subaddress field contains the unit subaddress associated with the customer unit that is currently receiving the desired program. For example, from exemplary list 111 the unit subaddress for TV1 102a is 0001. The unit subaddress is utilized in lieu of a conventional called party number element because SIU 100b does not have access to the identification that identifies the video program. The switching instruction merely instructs B-CSM 20 to deliver the video program to SIU 100b and TV2 102b that is currently being delivered to SIU 100a and TV1 102a. Processing of the SETUP message with MERGE request and other signaling messages can be performed by NMI processor 64 (see FIG. 4) or by other processing components of B-CSM 20.

If for some reason B-CSM 20 cannot perform task 118, then merge process 106 may exit or return a REJECT message to SIU 100b and TV2 102b in response to task 118. B-CSM 20 may not be able to perform task 118 if, for example, SIU 100a is currently inactive or if SIU 100a is not currently receiving a video program.

Following task 118, a task 120 responds to the switching instruction by delivering the video program to SIU 100b and subsequently to TV2 102b. Upon completion of task 120, the video program is concurrently being fed to TV1 102a and TV2 102b, however each of SIUs 100a and 100b retains independent control over the video program.

After the video program is delivered to TV2 102b in task 120, a query task 122 may be performed to determine whether to end delivery of the program to one of the customer units, in this example, either TV1 102a or TV2 102b. For example, B-CSM 20 may receive a DISCONNECT message or a request to change the current channel in response to a user input at TV1 102a or TV2 102b. When query task 122 finds that there is no request to end delivery of the video program to either TV1 102a or TV2 102b, then program control proceeds to a task 123. Task 123 maintains program delivery to both TV1 102a and TV2 102b. In conjunction with task 123, process 106 loops back to query task 122 to determine whether to end delivery of the program to one of the customer units.

When query task 122 finds that delivery of the video program is to end at either TV1 102a or TV2 102b, then a task 124 is initiated which terminates delivery of the video program to that customer unit. However, since both SIU 100a and SIU 100b retain independent control over the video program following a MERGE request, the video program is still on the remaining TV1 102a or TV2 102b.

Following task 124, a query task 125 is performed to determine whether to end delivery to the remaining TV1 102a or TV2 102b. When query task 125 finds that delivery of this video program is to end to the remaining customer unit, either TV1 102a or TV2 102b, task 126 is performed to terminate delivery of the video program to the associated SIU 100a or 100b.

When query task 125 finds that there is no request to end delivery of the video program to the remaining customer unit, either TV1 102a or TV2 102b, then program control proceeds to a task 127. Task 127 maintains program delivery to the remaining customer unit. In conjunction with task 127, process 106 loops back to query task 125 to determine whether to end delivery of the program to the remaining customer unit.

The program merging feature described above can be implemented where more than two customer units are currently active in one CPE 14. The user at the requesting customer unit location need only identify one of the other customer units to conveniently obtain the same video program.

In summary, the present invention provides an improved broadband switch that manages communication signal traffic between a remote switching module and at least one customer site. The broadband switch employs several operating methods that are compatible with a conventional signaling protocol. The broadband switch can respond to a request from a second customer unit to view a video program that is currently being delivered to a first customer unit. The second customer unit can access the video program currently being delivered to the first customer unit without having to identify the video program to the broadband switch. In addition, the broadband switch maintains delivery of the video program to one of the customer units after terminating delivery of the video program to the first customer unit other of the customer units.

The present invention has been described above with reference to preferred embodiments. However, those skilled in the art will recognize that changes and modifications may be made in these preferred embodiments without departing from the scope of the present invention. For example, the precise configuration of the preferred embodiment is discussed above for the sake of illustration, and those skilled in the art will recognize that the present invention can encompass a wide variety of configurations not specifically discussed herein. Moreover, the present invention is not limited to just the signals discussed herein. For example, SONET framing signals may be distributed with clock signals in the manner discussed above. These and other changes and modifications which are obvious to those skilled in the art are intended to be included within the scope of the present invention.

What is claimed is:

1. A broadband video switch operating method for managing communication signal traffic, said method comprising the steps of:

(a) delivering a communication signal to a first customer unit located at a customer site, said communication signal being identified by an identification code;

(b) receiving a message from a second customer unit located at said customer site, said message being a merge request identifying said first customer unit and lacking said identification code for said communication signal; and (c) delivering said communication signal to said second customer unit in response to said merge request.

2. A method according to claim 1, wherein said merge request includes an information element configured as a switching instruction, said switching instruction including a unique unit subaddress associated with said first customer unit for identifying said first customer unit.

3. A method according to claim 1, wherein:

said first customer unit is identified by a first subscriber address;

said second customer unit is identified by a second subscriber address; and said message includes a plurality of information elements that convey at least said first and second subscriber addresses.

4. A method according to claim 3, wherein said first subscriber address includes a subscriber number in conjunction with a first unique unit subaddress and said second subscriber address includes said subscriber number in conjunction with a second unique unit subaddress.

5. A method according to claim 1, wherein said communication signal is delivered substantially concurrently to said first and second customer units following said step (c).

6. A broadband video switch operating method for managing communication signal traffic, said method comprising the steps of:

(a) delivering a communication signal to a first customer unit located at a customer site, said communication signal being identified by an identification code;

(b) receiving a message from a second customer unit located at said customer site, said message being a merge request identifying said first customer unit and lacking said identification code for said communication signal; and (c) delivering said communication signal to said second customer unit in response to said merge request;

(d) terminating delivery of said communication signal to one of said first and second customer units; and (e) maintaining delivery of said communication signal to the other of said first and second customer units following said terminating step.

7. A broadband video switch operating method for managing communication signal traffic between a remote switching module and at least one customer site having first and second customer units, said method comprising the steps of:

(a) receiving a plurality of communication signals at said remote switching module;

(b) obtaining a message from said second customer unit, said message being a merge request identifying said first customer unit; and (c) delivering, in response to said merge request, one of said communication signals to said second customer unit when said one communication signal is currently being delivered to said first customer unit wherein said one communication signal is identified by an identification code and said merge request lacks said identification code for said one communication signal.

8. A method according to claim 7, wherein said merge request includes an information element configured as a switching instruction, said switching instruction including a unique unit subaddress associated with said first customer unit for identifying said first customer unit.

9. A method according to claim 7, wherein:

said first customer unit is identified by a first subscriber address;

said second customer unit is identified by a second subscriber address; and said message includes a plurality of information elements that convey at least said first and second subscriber addresses.

10. A method according to claim 9, wherein said first subscriber address includes a subscriber number in conjunction with a first unique unit subaddress and said second subscriber address includes said subscriber number in conjunction with a second unique unit subaddress.

11. A method according to claim 7, wherein said one communication signal is delivered substantially concurrently to said first and second customer units following said step (c).

12. A method according to claim 7, further comprising the steps of:

terminating delivery of said one communication signal to one of said first and second customer units; and maintaining delivery of said one communication signal to the other one of said first and second customer units following said terminating step.

13. A broadband video switch that manages communication signal traffic between a remote switching module and at least one customer site having first and second customer units, said switch comprising:

means for receiving a plurality of communication signals;

means for obtaining a message from said second customer unit, wherein said message is a merge request configured to identify said first customer unit and said merge request is configured to lack an identification code for one of said communication signals; and a plurality of switching modules configured to deliver, in response to said merge request, said one of said communication signals to said second customer unit when said one communication signal is currently being delivered to said first customer unit.

14. A switch according to claim 13, wherein:

said first customer unit is identified by a first subscriber address;

said second customer unit is identified by a second subscriber address; and said message is configured to include a plurality of information elements that convey at least said first and second subscriber addresses.

15. A switch according to claim 13, wherein said switching modules are configured to maintain delivery of said one communication signal to said first customer unit while delivering said one communication signal to said second customer unit.

16. A switch according to claim 13, wherein said switching modules are configured to maintain delivery of said one communication signal to one of said first and second customer units after terminating delivery of said one communication signal to the other one of said first and second customer units.

* * * * *